US007941436B2

(12) United States Patent  (10) Patent No.: US 7,941,436 B2
Popescul et al.  (45) Date of Patent: May 10, 2011

(54) KEYWORD BIDDING STRATEGY FOR NOVEL CONCEPTS

(75) Inventors: Alexandrin Popescul, Mountain View, CA (US); Clifford A. Brunk, Menlo Park, CA (US); Byron Dom, Los Gatos, CA (US)

(73) Assignee: Yahoo, Inc., Sunnyvale, CA (US)

( * ) Notice: Subject to any disclaimer, the term of this patent is extended or adjusted under 35 U.S.C. 154(b) by 225 days.

(21) Appl. No.: 11/607,299

(22) Filed: Nov. 30, 2006

(65) Prior Publication Data

US 2008/0133503 A1    Jun. 5, 2008

(51) Int. Cl.
    G06F 17/00    (2006.01)
    G06F 17/30    (2006.01)
    G06Q 30/00    (2006.01)
(52) U.S. Cl. .................. 707/750; 705/26.35; 705/14.71
(58) Field of Classification Search .................. 707/1–4
    See application file for complete search history.

(56) References Cited

U.S. PATENT DOCUMENTS

| | | | |
|---|---|---|---|
| 5,583,763 A | 12/1996 | Atcheson et al. | |
| 6,006,221 A | 12/1999 | Liddy et al. | |
| 6,009,409 A | 12/1999 | Adler et al. | |
| 6,026,368 A | 2/2000 | Brown et al. | |
| 6,076,088 A | 6/2000 | Paik et al. | |
| 6,102,969 A | 8/2000 | Christianson et al. | |
| 6,269,361 B1 * | 7/2001 | Davis et al. ........................ | 707/3 |
| 6,363,373 B1 | 3/2002 | Steinkraus | |
| 6,401,075 B1 | 6/2002 | Mason et al. | |
| 6,539,348 B1 | 3/2003 | Bond et al. | |
| 6,584,464 B1 | 6/2003 | Warthen | |
| 6,675,159 B1 | 1/2004 | Lin et al. | |
| 6,714,975 B1 | 3/2004 | Aggarwal et al. | |
| 6,772,150 B1 | 8/2004 | Whitman et al. | |
| 6,826,572 B2 | 11/2004 | Colace et al. | |
| 6,907,566 B1 | 6/2005 | McElfresh et al. | |
| 7,043,483 B2 | 5/2006 | Colace et al. | |
| 7,051,023 B2 | 5/2006 | Kapur et al. | |
| 2002/0082901 A1 * | 6/2002 | Dunning et al. ................. | 705/10 |
| 2002/0184212 A1 * | 12/2002 | Ugai et al. ........................ | 707/6 |
| 2003/0046161 A1 | 3/2003 | Kamangar et al. | |
| 2003/0055816 A1 * | 3/2003 | Paine et al. ........................ | 707/3 |
| 2003/0149938 A1 | 8/2003 | McElfresh et al. | |
| 2004/0093327 A1 | 5/2004 | Anderson et al. | |
| 2004/0107137 A1 * | 6/2004 | Skinner ............................ | 705/14 |
| 2004/0186776 A1 | 9/2004 | Llach | |
| 2005/0010477 A1 | 1/2005 | Sullivan et al. | |
| 2005/0102259 A1 * | 5/2005 | Kapur ............................... | 707/1 |
| 2005/0154746 A1 | 7/2005 | Liu et al. | |
| 2005/0234953 A1 * | 10/2005 | Zhang et al. .................. | 707/101 |
| 2006/0026063 A1 * | 2/2006 | Collins ............................ | 705/14 |

(Continued)

OTHER PUBLICATIONS

Song, Sen, et al., "Competitive Hebbian learning through spike-timing-dependent synaptic plasticty" Sep. 2000, Nature America Inc., Nature Neuroscience, vol. 3, No. 9, p. 919-926.*

(Continued)

*Primary Examiner* — Brent Stace
*Assistant Examiner* — Sabana Rahman
(74) *Attorney, Agent, or Firm* — Brinks Hofer Gilson & Lione (57) ABSTRACT

A system and method are disclosed for identifying a keyword that is a novel concept or anomaly based on prior search results for the keyword. Advertisements may be sold for the keyword, or the keyword may be purchased or recommended for purchase based on anticipation of increased future searches on the keyword.

20 Claims, 10 Drawing Sheets

U.S. PATENT DOCUMENTS

| | | | | |
|---|---|---|---|---|
| 2006/0074749 | A1* | 4/2006 | Kline et al. | 705/14 |
| 2006/0156222 | A1* | 7/2006 | Chi et al. | 715/512 |
| 2006/0190385 | A1* | 8/2006 | Dresden | 705/37 |
| 2007/0094072 | A1* | 4/2007 | Vidals et al. | 705/14 |

OTHER PUBLICATIONS

Salvador et al., "Learning States and Rules for Time Series Anomaly Detection", Department of Computer Sciences, Florida Institute of Technology, *American Association for Artificial Intelligence*, 2004.

Zhao et al., "Detecting Region Outliers in Meteorological Data", Department of Computer Science, Virginia Polytechnic Institute and State University, *GIS'03*, pp. 49-55, Nov. 7-8, 2003.

Bay et al., "Mining Distance-Based Outliers in Near Linear Time with Randomization and a Simple Pruning Rule", Institute for the Study of Learning and Expertise, NASA Ames Research Center Computational Sciences Division, *SIGKDD* '03, Aug. 24-27, 2003.

Lane et al., "Temporal Sequence Learning and Data Reduction for Anomaly Detection", Purdue University, *ACM Transactions on Information and System Security*, vol. 2, No. 3., pp. 295-331, Aug. 1999.

Pless et al., "Evaluation of Local Models of Dynamic Backgrounds", Department of Computer Science and Engineering, Washington University, downloaded from http://www.cs.wustl.edu/~pless/papers/plessDynamicBackgrounds.pdf on Feb. 20, 2007.

Bay et al., "A Framework for Discovering Anomalous Regimes in Multivariate Time-Series Data with Local Models", Center for the Study of Language and Information, Stanford University, NTT Communication Science Laboratories, downloaded from http://www.isle.org/~sbay/papers/darts.pdf on Feb. 20, 2007.

\* cited by examiner

KEYWORD BIDDING STRATEGY FOR NOVEL CONCEPTS

TECHNICAL FIELD

The present embodiments relate to a system for keyword recognition and bidding.

BACKGROUND

Online advertising may be an important source of revenue for enterprises engaged in electronic commerce. A number of different kinds of page-based online advertisements are currently in use, along with various associated distribution requirements, advertising metrics, and pricing mechanisms. Processes associated with technologies such as Hypertext Markup Language (HTML) and Hypertext Transfer Protocol (HTTP) enable a page to be configured to contain advertisements.

For a search engine or search website, advertisements may be associated with the search term(s) that is entered. A search term may also be referred to as a keyword or query. Advertisers may be given the option of purchasing various search terms for a fee. When the purchased search terms are entered by a user, the advertiser's ads are shown on the results page for that search term. The fee for a search term may be a fixed rate or may be based on the number of times the search term is used, or be paid based on the number of times the advertisement is viewed or clicked on by a user. Further, current buying and selling of search terms for advertisements may be based on the popularity of the search terms. Accordingly, the price for both buying and selling increases as the popularity of a search term increases. Therefore, it may be beneficial to recognize the fluctuation in popularity of particular search terms.

BRIEF SUMMARY

By way of introduction, the embodiments described below include a system and method for keyword recognition and bidding. The embodiments relate to the analysis of keyword or search term activity to determine its popularity and to recognize those keywords that may represent a novel or anomalous event whose popularity may be increasing.

In a first aspect, a method is disclosed for utilizing an anomalous query in bidding. The method includes identifying a query from a plurality of search queries in a search log database. The search log database is monitored to determine a first frequency at which the identified query has been searched for during a first time interval. A second frequency at which the identified query is searched is monitored during a second time interval. At least one of selling the identified query at an adjusted rate, purchasing the identified query for an advertisement, or recommending the identified query for an advertisement purchase are performed if either the first frequency or the second frequency is above a threshold frequency and if the second frequency of the identified query has increased by a certain amount over the first frequency.

In a second aspect, a computer readable storage medium is disclosed having keyword identification. The storage medium includes instructions for monitoring a keyword database that includes keyword usage data and identifying a keyword that has an unusually high frequency. The step of identifying includes measuring a frequency of the identified keyword; observing a frequency change with the keyword; determining a threshold frequency; and recognizing the keyword as having an unusually high frequency if the frequency exceeds the threshold frequency and the frequency change exceeds a predetermined frequency change.

In a third aspect, a system identifies an anomalous query. The system includes a search engine configured to receive queries and provide search results based on the queries and a search log database coupled with the search engine that is configured to record the queries received by the search engine. An event detector coupled with the search log database is configured to monitor the frequency of the queries that are input into the search engine. The event detector is configured to recognize an anomalous query based on an increase in frequency of the anomalous query if the frequency exceeds a frequency threshold.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims and be defined by the following claims. Nothing in this section should be taken as a limitation on those claims. Further aspects and advantages are discussed below in conjunction with the preferred embodiments.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

DETAILED DESCRIPTION

The principles described herein may be embodied in many different forms. The embodiments relate to a system and method for keyword recognition and bidding. Keywords may also be referred to as searches, search terms, terms, or queries. The recognition of novel events or anomalies in keyword searches from search logs may be used to improve on pricing and cost inefficiencies in the buying and selling of the keyword for advertisements. Novel events may include previously low traffic searches, which suddenly start growing in popularity.

Figure 1:
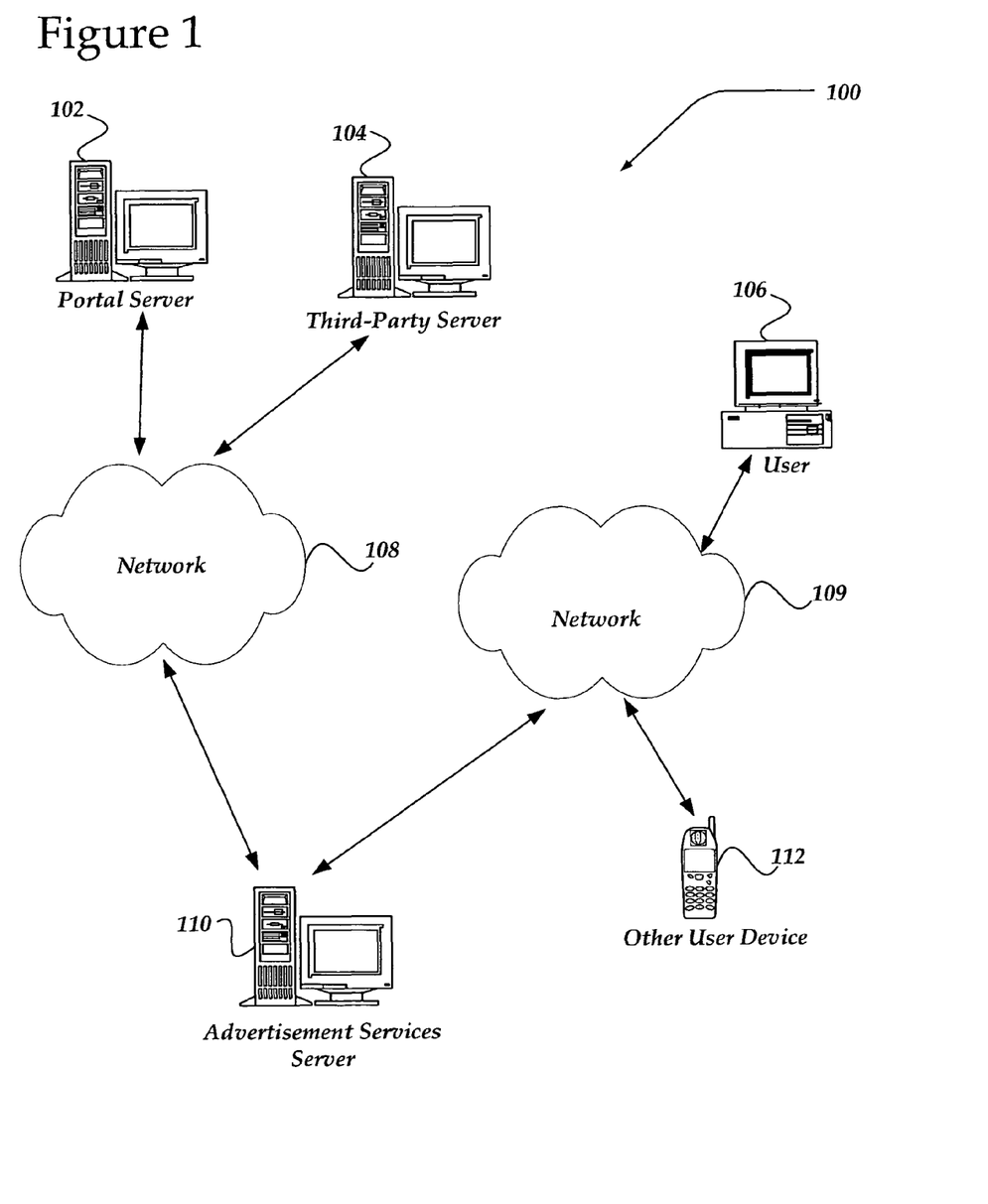
FIG. 1 provides a view of one embodiment of an operating environment.

FIG. 1 provides a simplified view of a network environment 100. Not all of the depicted components may be required, however, and some embodiments of the invention may include additional components not shown in the figure. Variations in the arrangement and type of the components may be made without departing from the spirit or scope of the claims as set forth herein. Additional, different or fewer components may be provided.

In FIG. 1, environment 100 includes an advertisement services server 110, which may provide a platform for selection, optimization, and/or distribution of advertisements for inclusion in pages, such as web pages. Further, the advertisement services server may be configured to monitor search logs and recognize novel events as discussed below. Pages may be provided to users by a portal server 104 and/or a third-party server 102. In FIG. 1, users are represented by a user device 106, depicted as a conventional personal computer, and/or other device such as a mobile user device 112, including a network-enabled mobile phone, personal digital assistant (PDA), pager, network-enabled television, digital video recorder, such as TIVO® (sold by TiVo, Inc., Alviso, Calif.), and/or automobile.

Some or all of advertisement services server 110, portal server 104, and third-party server 102 may be in communication with each other by way of network 108. The advertisement services server 110 and portal server 104 may each represent multiple linked computing devices, and multiple third-party servers, such as third-party server 102, may be included in environment 100. Network 108 may be regarded as a public or private network connection and may include, for example, a virtual private network or an encryption or other security mechanism employed over the public Internet, or the like.

User device 106 and mobile user device 112 are represented by user-interactive devices that typically run browser applications, and the like, to display requested pages received over a network. The user may be a consumer of goods or services that is searching for a business such as a business of the advertiser. Such devices are in communication with portal server 104 and/or third-party server 102 by way of network 109. Network 109 may include the Internet and may include all or part of network 108; network 108 may include all or part of network 109. Network 109 is also discussed below in connection with FIG. 2.

Figure 6:
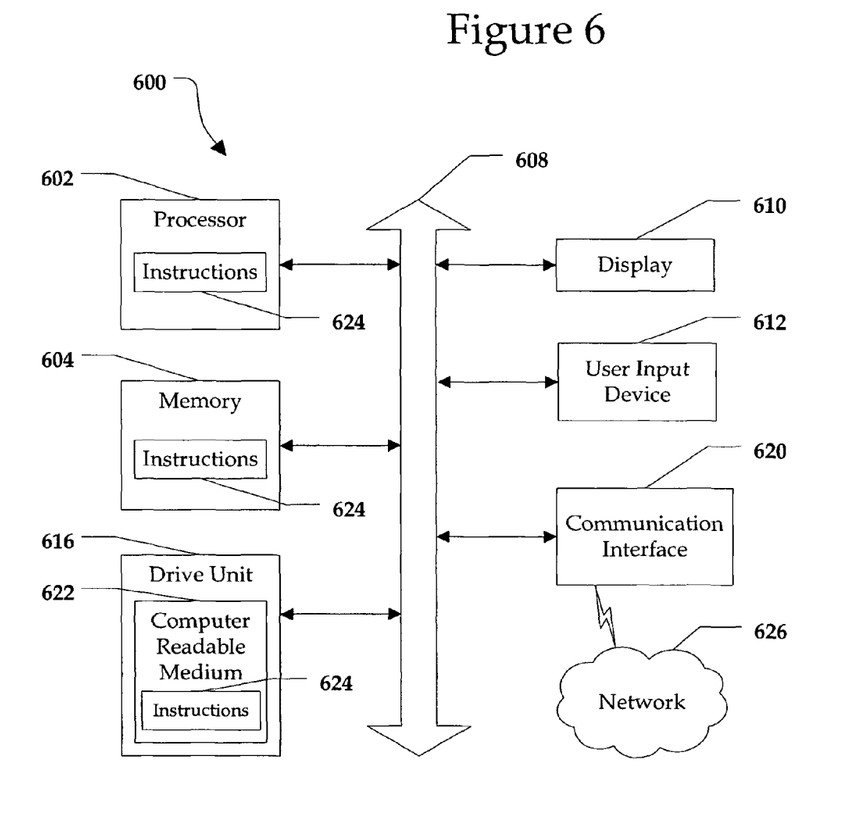
FIG. 6 is an illustration a general computer system.

Portal server 104, third-party server 102, advertisement services server 110, user device 106, and mobile user device 112 represent computing devices of various kinds. Such computing devices may generally include any device that is configured to perform computation and that is capable of sending and receiving data communications by way of one or more wired and/or wireless communication interfaces and may be represented as shown in FIG. 6. Such devices may be configured to communicate in accordance with any of a variety of network protocols, including but not limited to protocols within the Transmission Control Protocol/Internet Protocol (TCP/IP) protocol suite. For example, user device 106 may be configured to execute a browser application that employs HTTP to request information, such as a web page, from a web server, which may be a process executing on portal server 104 or third-party server 102.

Networks 108, 109 may be configured to couple one computing device to another computing device to enable communication of data between the devices. Networks 108, 109 may generally be enabled to employ any form of machine-readable media for communicating information from one device to another. Each of networks 108, 109 may include one or more of a wireless network, a wired network, a local area network (LAN), a wide area network (WAN), a direct connection such as through a Universal Serial Bus (USB) port, and the like, and may include the set of interconnected networks that make up the Internet. Networks 108, 109 may include any communication method by which information may travel between computing devices. The advertisement services server 110 may be used for providing advertisements that are displayed to users 106. The displayed advertisements may be related to keywords that are used by a user 106 in a search as further described in FIG. 2.

Figure 2:
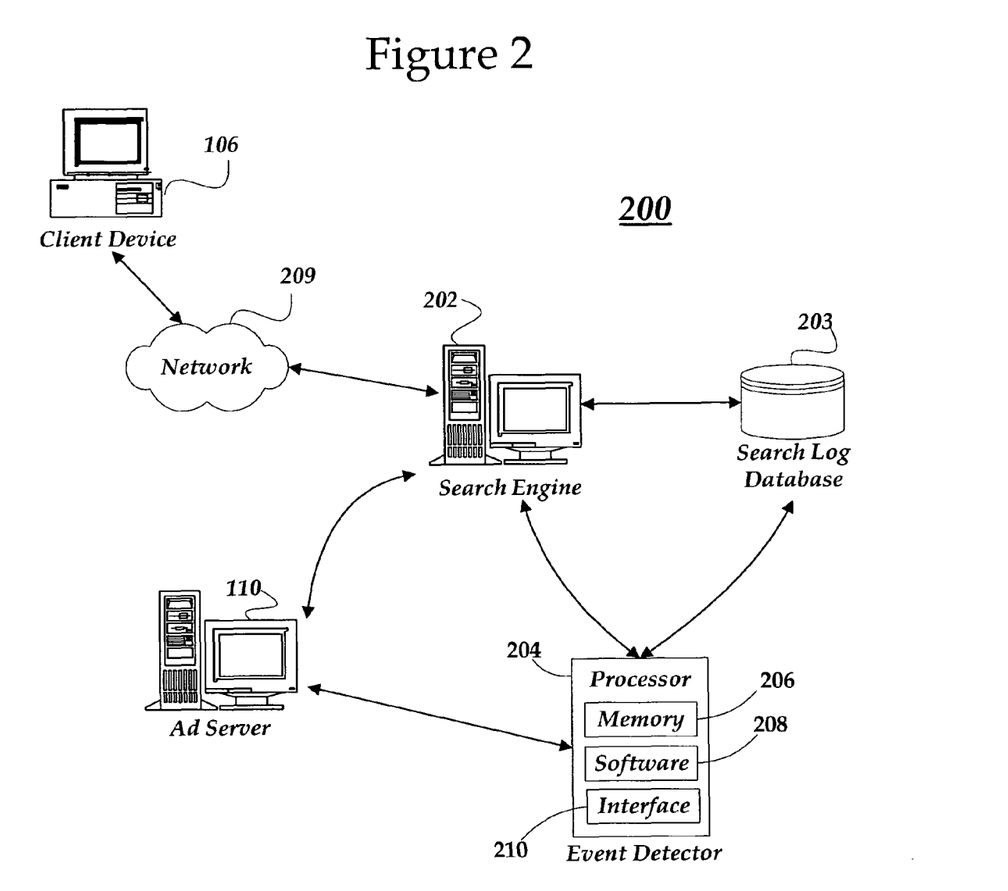
FIG. 2 is a block diagram of one embodiment of an exemplary system.

FIG. 2 is a block diagram of one embodiment of an exemplary system 200. In particular, system 200 is a network environment in which an event detector 204 may be used to recognize novel events. A client device 106 is coupled with a search engine 202 through network 209. The search engine 202 is coupled with a search log database 203, and both are coupled with the event detector 204. An ad server 110 may be further coupled with the search engine 202 and the event detector 204. Variations in the arrangement and type of the components may be made without departing from the spirit or scope of the claims as set forth herein. Additional, different or fewer components may be provided.

The client device 106 may be a computing device for a user to connect to a network 209, such as the Internet. Examples of a client device include but are not limited to a personal computer, personal digital assistant ("PDA"), cellular phone, or other electronic device. The client device 106 may be configured to access web pages or other data/information over the network 209. The client device 106 may be a computer enabling a user to view web pages over the network 109, such as the Internet. In one embodiment, a user views a browser containing data from the Internet. The data displayed on the browser may include advertisements. In an alternate embodiment, other software programs may also display advertisements received over the network 109 or from a different source.

In one embodiment, the search engine 202 includes an interface or a web page, such as the web page which may be accessed on the World Wide Web at yahoo.com, which is used to search for pages in the network 209. The client device 106 or user may input a search term (also referred to throughout as a keyword or a query) for the search engine 202. The search engine 202 may perform a search for the keyword and display the results of the search for the client device 106. The search engine 202 may include or be coupled with a search log database 203. The search log database 230 includes records or logs of all searches performed by the search engine 202 and may also be referred to as a keyword database or query database An ad server 110 is coupled with the search engine 202 and is configured to provide advertisements to be displayed on the client device 106 with the search results. In one embodiment, advertisers pay a fee for particular keywords and whenever a user searches for that keyword, the advertiser's ad is displayed with the search results. The fee for any given keyword may be based upon its popularity with users. Accordingly, as the popularity of a keyword increases, so does the cost to advertisers to purchase ad space associated with that keyword.

When a user performs a search on client device 106, the search is submitted to the search engine 202 over the network 209. The search request is recorded in the search log database 203. The results of the search are determined by the search engine 202 and the ad server provides the relevant advertisement for the particular search. The search results including the ads are displayed on the client device 106.

In one embodiment, the search engine 202 and/or the search log database 203 may be coupled with the event detector 204. The event detector 204 monitors the search log database 203 to identify trends in the keywords that are searched for by users. In one embodiment, the event detector 204 identifies keywords that are novel events or anomalies, such that there is a spike in the frequency with which the keyword is searched for. For example, a breaking news event may result in a spike in the frequency with which particular keywords are searched for. The monitoring of the search log database 203 may identify novel concepts or keywords that are increasing in popularity so that those keywords may be bid on in other search engines before the price is adjusted, or for raising the price of the keyword in the search engine 202 to account for both its increase and projected increase in popularity as a novel event.

The event detector 204 may include a processor, memory 206, software 208 and an interface 210. In one embodiment, the event detector 204 is a separate component from the search engine 202 and the ad server 110. In an alternate embodiment, any of the event detector 204, search engine 202, or the ad server 110 may be combined as a single component. The interface 210 may communicate with any of the search engine 202, search log database 203, or ad server 110. Alternatively, the interface 210 may be a user interface or user input configured to allow a user to interact with any of the components of the event detector 204.

The processor in the event detector 204 may be a central processing unit (CPU), a graphics processing unit (GPU), digital signal processor (DSP) or other type of processing device. The processor may be a component in a variety of systems. For example, the processor may be part of a standard personal computer or a workstation. The processor may be one or more general processors, digital signal processors, application specific integrated circuits, field programmable gate arrays, servers, networks, digital circuits, analog circuits, combinations thereof, or other now known or later developed devices for analyzing and processing data. The processor may operate in conjunction with a software program, such as code generated manually (i.e., programmed).

The processor may include a memory 206, or the memory 206 may be a separate component. The interface 210 and/or software 208 may be stored in memory 206. The memory 206 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 206 includes a random access memory for the processor. In alternative embodiments, the memory 206 is separate from the processor, such as a cache memory of a processor, the system memory, or other memory. The memory 206 may be an external storage device or database for storing recorded image data. Examples include a hard drive, compact disc ("CD"), digital video disc ("DVD"), memory card, memory stick, floppy disc, universal serial bus ("USB") memory device, or any other device operative to store image data. The memory 206 is operable to store instructions executable by the processor. The functions, acts or tasks illustrated in the figures or described herein may be performed by the programmed processor executing the instructions stored in the memory 206. The functions, acts or tasks are independent of the particular type of instructions set, storage media, processor or processing strategy and may be performed by software, hardware, integrated circuits, firmware, micro-code and the like, operating alone or in combination. Likewise, processing strategies may include multi-processing, multitasking, parallel processing and the like.

In one embodiment, the software 208, possibly including a browser may be stored in memory 206. The processor is configured to execute the software 208. The browser may be a web browser configured to display information and data retrieved from the Internet or other network. For example, the browser may be INTERNET EXPLORER® (sold by Microsoft Corp., Redmond, Wash.), or some other web browser. The browser may be configured to receive and display advertisements to the user while providing various content, such as the results from a keyword search or query.

Any of the components in system 200 may be coupled with one another through a network. For example, the event detector 204 may be coupled with the search engine 202, search log database 203, or ad server 110 via a network. Accordingly, any of the components in system 200 may include communication ports configured to connect with a network. Accordingly, the present disclosure contemplates a computer-readable medium that includes instructions or receives and executes instructions responsive to a propagated signal, so that a device connected to a network can communicate voice, video, audio, images or any other data over a network. The instructions may be transmitted or received over the network via a communication port that may be a part of a processor or may be a separate component. The communication port may be created in software or may be a physical connection in hardware. The communication port may be configured to connect with a network, external media, display, or any other components in system 200, or combinations thereof. The connection with the network may be a physical connection, such as a wired Ethernet connection or may be established wirelessly as discussed below. Likewise, the additional connections with other components of the system 200 may be physical connections or may be established wirelessly.

The network or networks that may connect any of the components in system 200 may include wired networks, wireless networks, or combinations thereof. The wireless network may be a cellular telephone network, a network operating according to a standardized protocol such as IEEE 802.11, 802.16, 802.20, published by the Institute of Electrical and Electronics Engineers, Inc., or WiMax network. Further, the network(s) may be a public network, such as the Internet, a private network, such as an intranet, or combinations thereof, and may utilize a variety of networking protocols now available or later developed including, but not limited to TCP/IP based networking protocols.

The interface 210 may be a user input or a display. The interface 210 may include a keyboard, keypad or a cursor control device, such as a mouse, or a joystick, touch screen display, remote control or any other device operative to interact with the event detector 204. The interface 210 may include a display coupled with the processor and configured to display an output from the processor. The display may be a liquid crystal display (LCD), an organic light emitting diode (OLED), a flat panel display, a solid state display, a cathode ray tube (CRT), a projector, a printer or other now known or later developed display device for outputting determined information. The display may act as an interface for the user to see the functioning of the processor, or specifically as an interface with the software 208, such as a browser stored in the memory 206. The software 208, such as a browser that is in the display may include advertisements, which are visible to the user.

Figure 3:
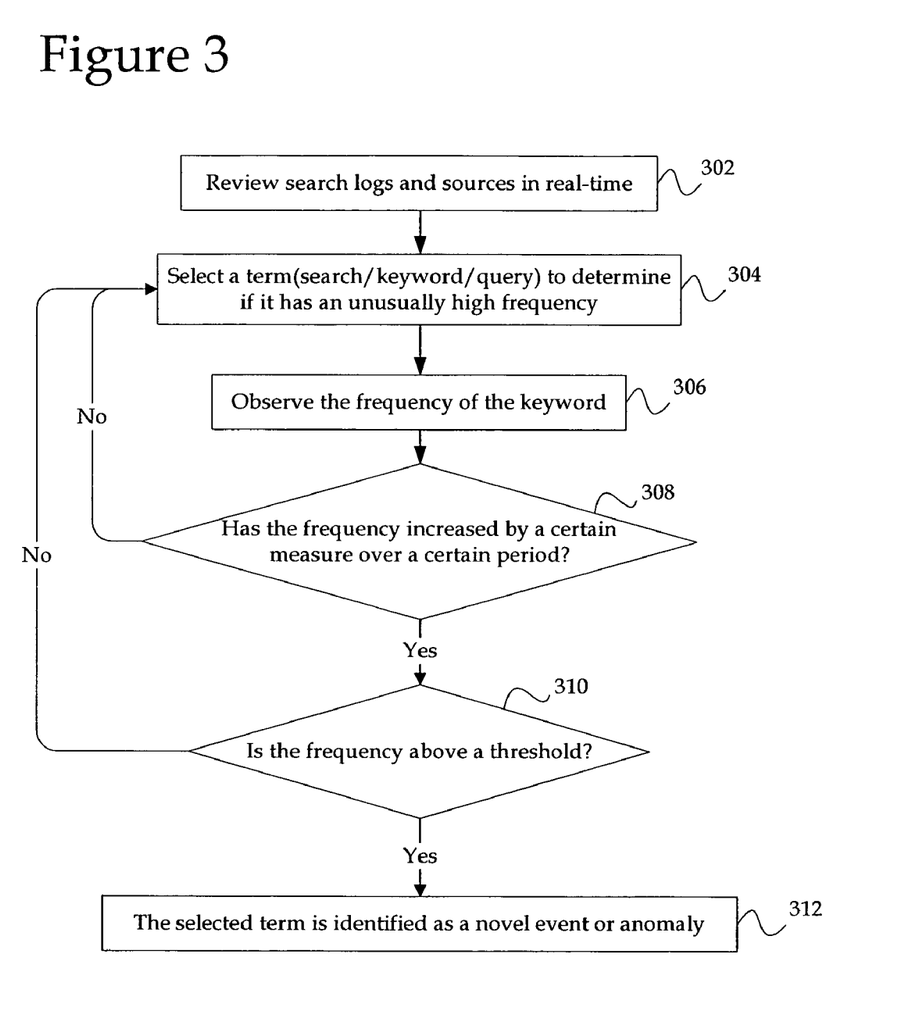
FIG. 3 is a flowchart depicting one embodiment of identification.

FIG. 3 is a flowchart depicting one embodiment of identification of a novel event or anomalous keyword. As discussed above in connection with FIG. 2, the event detector 204 may identify novel concepts or keywords that are increasing in popularity so that those keywords may be bid on in other search engines before the price is adjusted, or for raising the price of the keyword in the search engine 202 to account for both its increase and projected increase in popularity as a novel event. In block 302, the search logs are reviewed in real-time. The search logs may be stored in the search log database 203 or be located with the search engine 202. In block 304, a keyword is selected for analysis. As mentioned above, the keyword may be referred to as a search term or search query, and is representative of a user's request for more information.

In block 306, the popularity of the keyword is reviewed. Popularity may refer to any measure of the use of a keyword. In particular, in block 308, a determination is made whether the frequency has increased by a certain measure over a certain period. The determination may be made by the event detector 202 to determine whether the keyword is associated with a novel event or anomaly. In one embodiment, the time period may be the most recent block of time, such as the last ten minutes, last 30 minutes, last hour, or any other time increment. The popularity of the selected keyword may be measured continuously over the time increment. Alternatively, the time increments may be used to determine the frequency of the keyword. For example, the frequency of the keyword may be measured in consecutive ten minute increments. Accordingly, the increase may be a percent increase from the frequency in one time increment to the frequency in a second time increment. For example, if the current time is 2:00 pm, and the frequency from 1:40-1:50 was 10 searches and the frequency from 1:50-2:00 was 50 searches, then an increase of 400% has been identified.

In one alternate embodiment, the frequency over a current time interval may be compared with an average value of the frequencies over multiple previous time intervals. The average value may include a mean, median, mode or other metric identifying a normal value. In additional alternate embodiments, the time intervals or time increments may be overlapping. Overlapping time intervals may result in smoother frequency readings. In another alternative embodiment, non-overlapping time intervals may be used to reduce the amount and/or cost of monitoring frequencies. For example, every other ten minute interval may be measured.

If the keyword does not have a frequency increase above a certain amount, then return to block 304 to select another keyword. This return to block 304 indicates that the keyword is not a novel event or anomaly that suggests a drastic increase in popularity. If the keyword does have a frequency increase above a certain amount over a certain time, then proceed to block 310. In block 310, the frequency is compared with a threshold frequency value. If the frequency of the keyword is less than a threshold frequency, then return to block 304 to select another keyword. The frequency threshold may act as a filter for those keywords with very low frequency that may happen to have a slightly higher frequency. For example, a keyword that averages less than 1 hit or search every ten minutes may have 3 hits or searches in a ten minute period which might trigger as a novel event or anomaly without the threshold frequency because of the more than three-fold increase. The threshold frequency may filter out all keywords with minimal-frequency. In one example, the threshold frequency may be 10 hits in a 10 minute period. Accordingly, if the frequency exceeds the threshold frequency, then proceed to block 312. In block 312, we have identified a keyword that is a novel event/concept or anomaly, which may currently be experiencing a significant increase in popularity. The recognition of a novel event or anomaly may be a recognition of an upwards trend in popularity for the keyword. As discussed below, FIG. 5 relates to the possible approaches following identification of a novel event.

Figure 7:
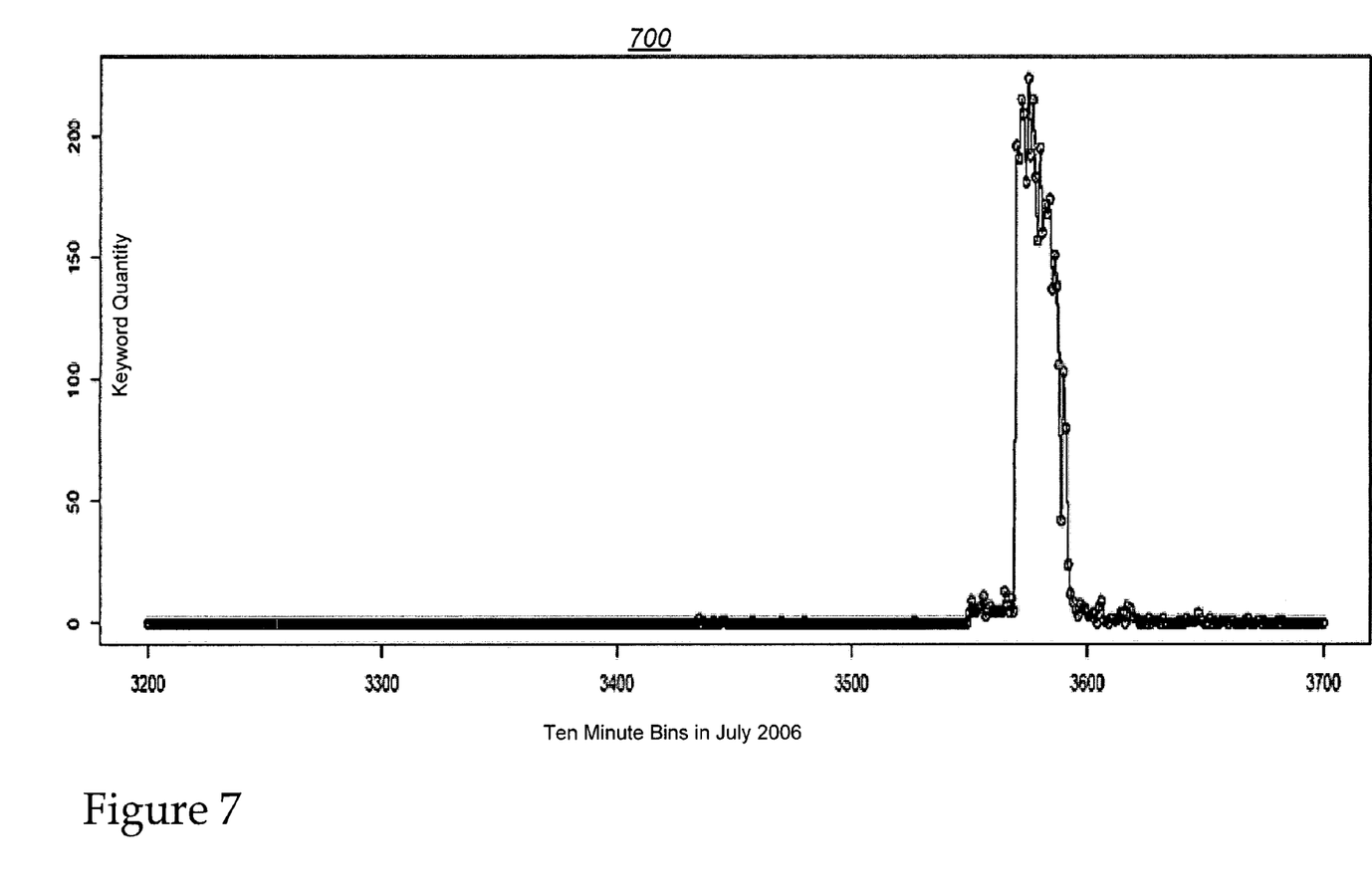
FIG. 7 is an illustration of one example of a frequency chart.

FIGS. 7-10 are exemplary illustrations of examples of frequency charts for particular keywords or queries. The frequency charts may identify keywords that have a surge or spike in popularity. Each of FIGS. 7-10 display the keyword quantity or frequency as a function of the time in ten minute bins for the month of July 2006. In other words, bin 1 represents the first 10 minutes of July 2006, bin 2 represents the second 10 minutes of July 2006 (12:10-12:20 a.m., July 1), bin 3 represents the third 10 minutes of July 2006 (12:20-12:30 a.m., July 1), etc. Accordingly, the x-axis of each of FIGS. 7-10 represent particular times during July 2006. In FIG. 7, chart 700 depicts the keyword "rolling blackout." At approximately the 3,570th bin (35,700 minutes into the month of July 2006), there is a spike in frequency of the keyword that is indicative of anomalous behavior. Chart 700 shows that for most of the previous 370 bins, the frequency of "rolling blackout" was zero until the 3,570th bin when a spike is identified.

Figure 8:
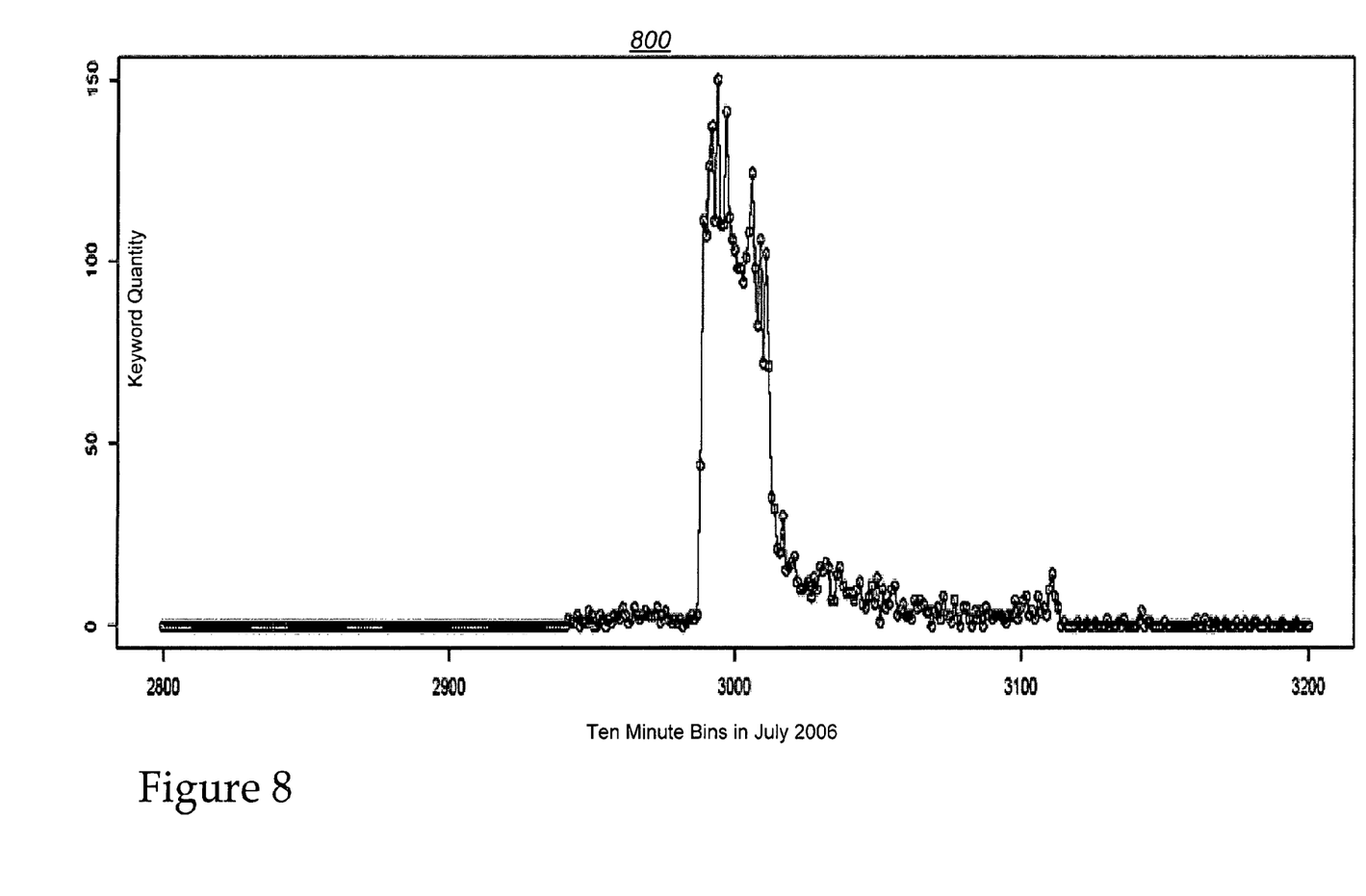
FIG. 8 is another illustration of one example of a frequency chart.
Figure 9:
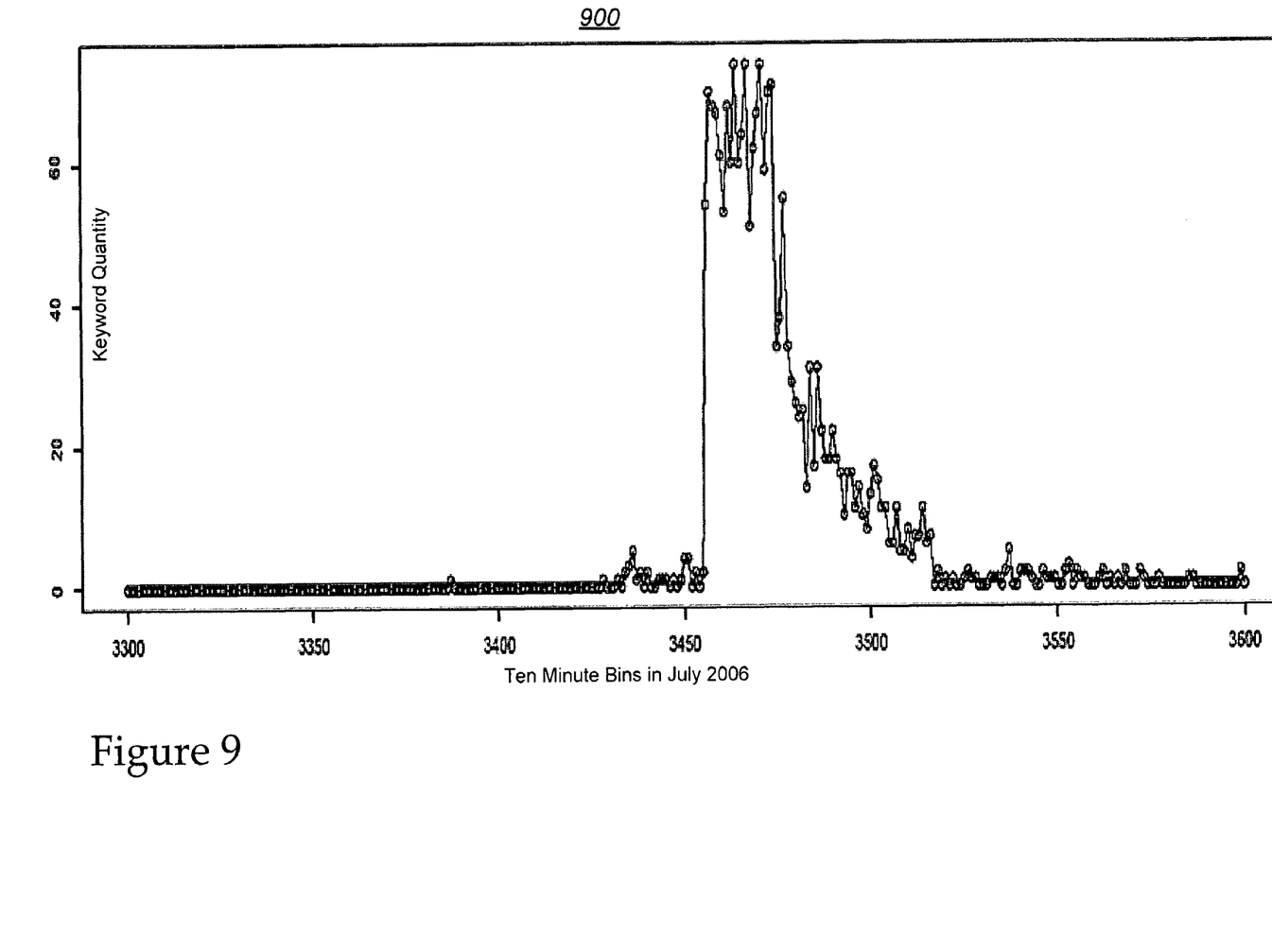
FIG. 9 is another illustration of one example of a frequency chart.
Figure 10:
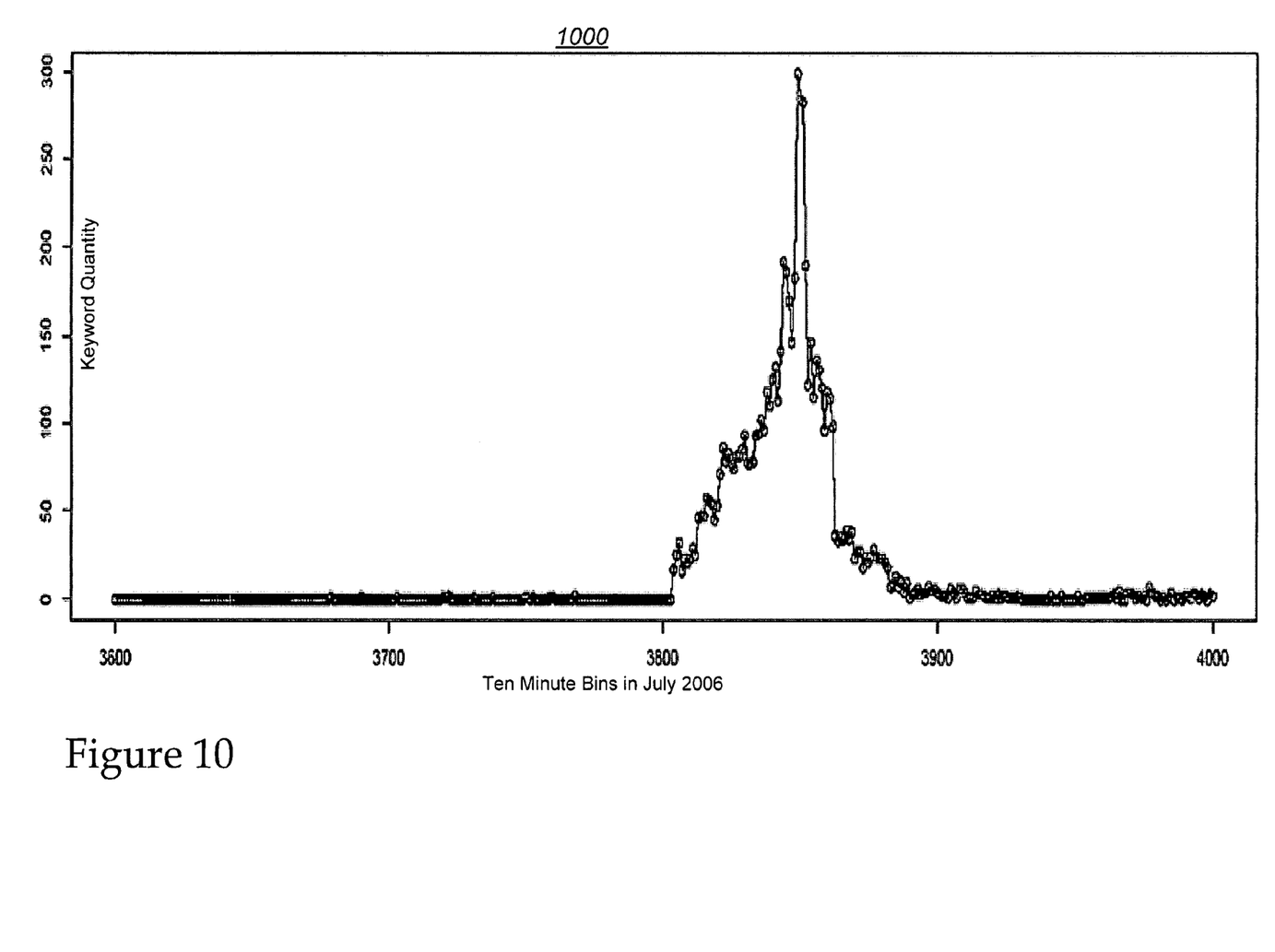
FIG. 10 is another illustration of one example of a frequency chart.

In FIG. 8, chart 800 depicts the frequency of the keyword "miss universe 2006 contestant pictures." The spike is detected at approximately the 2,990th bin. The previous 1,900 minutes (bins 2800-2990) all had a frequency or quantity of approximately zero until a spike is observed. In FIG. 9, chart 900 depicts the frequency of the keyword "miss universe faints." There is a spike for this keyword at approximately bin 3455. In FIG. 10, chart 1000 depicts the keyword "steve nash haircut." This keyword began spiking in frequency at bin 3800. All of FIGS. 7-10, and charts 700-1000 illustrate examples of spikes in a particular keyword or query. As described herein, identification of those keywords and appropriate action based on that identification may be beneficial. FIGS. 7-10 are merely one embodiment of the monitoring of keywords. In alternate embodiments, the bins may be shorter or longer and measured less frequency or more frequently. The bins may be overlapping or may include gaps of time between bins. Alternatively, the monitoring of keywords may not be using bins based on a period of time, but rather the time may be measured to reach a certain quantity. Any monitoring of the frequency of a keyword may be used.

Figure 4:
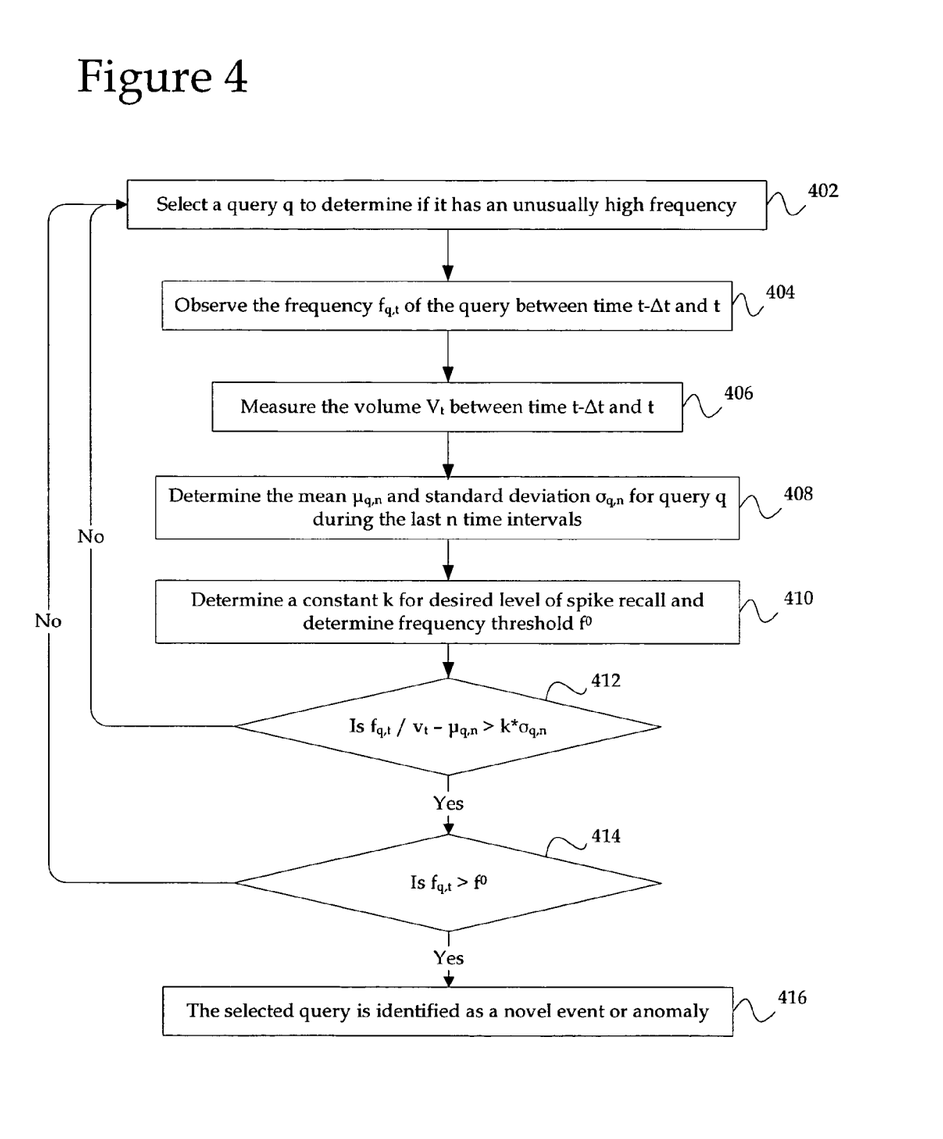
FIG. 4 is a flowchart depicting an alternate embodiment of identification.

FIGS. 7-10 are representative of the monitoring that may take place according to the embodiments discussed above in conjunction with FIGS. 2 and 3 and discussed below in conjunction with FIGS. 4 and 5. In particular, FIG. 4 is a flowchart depicting an alternate embodiment of identification of a novel event or anomalous keyword. In particular, FIG. 4 includes an alternate embodiment of FIG. 3. In block 402 a query q is selected for determining whether query q has an unusually high frequency. In block 404, the frequency $f_{q,t}$ of the query q is measured between time t-$\Delta$t and t. Time t may be the current time or any other prior time and time $\Delta$t is a time interval of a certain length. If the time t is 2:00 and the time interval $\Delta$t is 10 minutes, then the frequency $f_{q,t}$ is measured between 1:50 and 2:00. As described below, a comparison may be made between two intervals, however, in alternate embodiments a single interval may be compared with multiple intervals or vice-versa. For example, the current time interval may be compared with an average of several previous intervals.

In block 406, the volume $V_t$ is measured between time t-$\Delta$t and t. The volume $V_t$ is a measure of overall traffic. The volume $V_t$ is a normalization factor that may be used to account for seasonal, weekly, daily, or other variability in query traffic. For example, the traffic may be lower between midnight and 8 am. On December 25th, the traffic may also be lower. The volume $V_t$ may be used to help establish what the frequency threshold should be set at. During times when the volume $V_t$ is higher, the frequency threshold should be higher and during times when the volume $V_t$ is lower, the frequency threshold should be lower. In an alternate embodiment, the volume $V_t$ may include a subset of traffic, rather than the overall volume of queries. For example, the volume $V_t$ may include only a certain-type of query.

In block 408, the mean $\mu_{q,n}$ and standard deviation $\sigma_{q,n}$ for query q are determined during the last n time intervals $\Delta t$. The mean $\mu_{q,n}$ and standard deviation $\sigma_{q,n}$ are calculated based on the normalized frequency readings for query q or from the normalized frequency vector (f/V). In other words, the mean $\mu_{q,n}$ and standard deviation $\sigma_{q,n}$ are calculated from the vector: $(f_{q,t-(n-1)*\Delta t}/V_{t-(n-1)*\Delta t}), \ldots, (f_{q,t-\Delta t}/V_{t-\Delta t}), (f_{q,t}/V_t)$.

In block 410, an application specific constant k is selected. The constant k may be referred to as a spike constant. The constant k may establish the desired level of the frequency spike for determining a novel event or anomaly. The constant k may allow for control of the desired level of recall. Higher values of k may result in fewer but more accurate hits. Accordingly, lower values of k may increase coverage at the expense of including some queries that were not spiking, but may have been triggered by noise in their frequency distribution. Also, in block 410, the threshold frequency $f^0$ is determined. As discussed above, the threshold frequency $f^0$ is the minimum frequency for which a query must exceed to be considered as a novel event according to block 414 discussed below.

In block 412, a comparison is made based on the variables discussed above. In particular, a determination is made regarding whether:

$$f_{q,t}/V_t - \mu_{q,n} > k*\sigma_{q,n} \quad \text{(Equation 1)}$$

In equation 1, the frequency is divided by the volume and then the mean of the normalized frequency readings is subtracted. That value is compared with the constant multiplied by the standard deviation of the normalized frequency readings. If $f_{q,t}/V_t - \mu_{q,n}$ is greater than $k*\sigma_{q,n}$, then proceed to block 414, otherwise return to block 402 to select a different query q. The return to block 402 means that the query q is not a novel event or anomaly.

In block 414, the frequency is compared with the threshold frequency:

$$f_{q,t} > f^0 \quad \text{(Equation 2)}$$

If the frequency $f_{q,t}$ is not greater than the threshold frequency $f^0$ (the converse of Equation 2), then return to block 402 to select a different query q. If the frequency is greater than the threshold frequency (as in Equation 2), then proceed to block 416. In block 416, it is established that the query q is a novel event or an anomaly. Accordingly, FIG. 4 establishes that if Equation 1 and Equation 2 are satisfied, then the query q in question is a novel event that is rising in popularity.

FIG. 4 is merely one embodiment for the determination or identification of anomalous queries. In alternate embodiments, the determination may be made with different equations utilizing fewer or greater variables. Both FIG. 3 and FIG. 4 represent the identification of an anomalous query. Once an anomalous query is identified, FIG. 5 suggests the options for handling the query.

Figure 5:
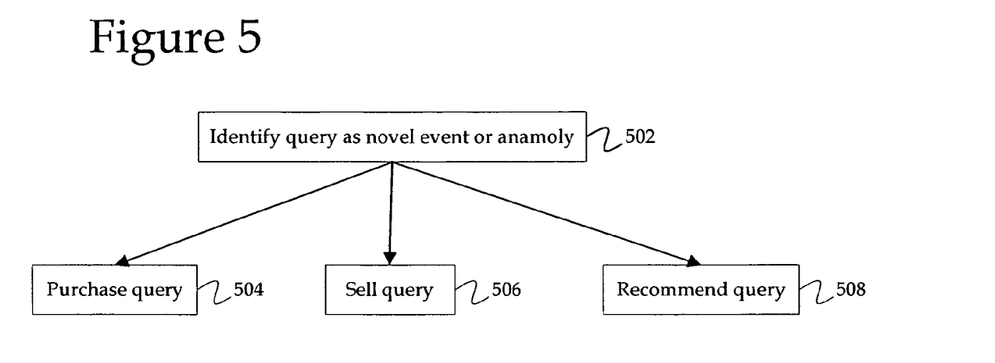
FIG. 5 is a flowchart depicting an embodiment of usage.

FIG. 5 is a flowchart depicting an embodiment of usage for an identified keyword. In block 502, a query is identified that is a novel event or anomaly. The identification may be as discussed in either FIG. 3 or FIG. 4 or may be identified from an alternative method or embodiment. Once such a query has been identified, three potential results are shown in FIG. 5. In particular, the query may be purchased (block 504), the query may be sold (block 506), or the query may be recommended (block 508).

In block 504, the identified query may be purchased. As discussed above, the price of a query is often dependent on the popularity of that query. The identification of a query in block 502 is indicative of a query that is likely to increase in popularity based on the current spike in its popularity. Accordingly, the price at which search engines will sell the query for is likely to soon rise. Therefore, shortly after identifying a novel event query or anomalous query is a good time to purchase that query from other search engines or websites. As one example, Yahoo!® may monitor its own search logs and identify anomalous queries and then proceed to purchase the same queries from other search engines such as Google®, in order to purchase at the lower price prior to an increase in popularity and price. Yahoo!® may advertise its Yahoo!® News site based on breaking news, so that when a consumer searches on another search site for the breaking news query Yahoo!® News is one of the ads that are displayed.

Rather than purchase the identified query, the identified query may be sold as in block 506. Once the query is identified as a novel event, then the price at which it is purchased should be raised accordingly. The price may be raised to reflect the anticipated increase in search queries. In other words, the price of the query is not based on current popularity, but rather the anticipated popularity.

Alternatively, the identified query may be recommended to advertisers as in block 508. Once the query is identified, then it may be recommended to the most relevant advertisers. For example, if the identified query relates to an upcoming hurricane, then weather-related advertisers may be contacted for purchasing the query as its popularity is on the rise. In one embodiment, a search engine may identify the anomalous queries as a service to its customers/advertisers. Some advertisers may pay extra for the ability to receive updates on identified queries that qualify as a novel event. Accordingly, the identification of anomalous queries may be used to better serve a search engine's customers/advertisers utilizing existing search logs.

As described above, query spikes may be used for a variety of purposes. In an alternative embodiment, a query drop or dip may also be monitored and recognized. If a query drop is identified, then that query should not be purchased without a proper price adjustment. Likewise, the selling of the query may need to be modified to reflect the reduced interest in the query.

Referring to FIG. 6, an illustrative embodiment of a general computer system is shown and is designated 600. As discussed above, the components described in either FIG. 1 or FIG. 2 may be computer system 600 or may be any component of computer system 600. In particular, the client device 106, search engine 202, search log database 203, ad server 110, keyword database 214, portal server 102, third-party server 104, user 106, user device 112, or event detector 204 may be a computer system 600 or any of the components in a computer system 600. The computer system 600 may include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 600 can be implemented using electronic devices that provide voice, video or data communication. Further, while a single computer system 600 is illustrated, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 604 includes a cache or random access memory for the processor 602. In alternative embodiments, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the programmed processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display unit 614, such as a liquid crystal display (LCD), an organic light emitting diode (OLED), a flat panel display, a solid state display, a cathode ray tube (CRT), a projector, a printer or other now known or later developed display device for outputting determined information. The display 614 may act as an interface for the user to see the functioning of the processor 602, or specifically as an interface with the software stored in the memory 604 or in the drive unit 606.

Additionally, the computer system 600 may include an input device 616 configured to allow a user to interact with any of the components of system 600. The input device 616 may be a number pad, a keyboard, or a cursor control device, such as a mouse, or a joystick, touch screen display, remote control or any other device operative to interact with the system 600.

In a particular embodiment, as depicted in FIG. 6, the computer system 600 may also include a disk or optical drive unit 606. The disk drive unit 606 may include a computer-readable medium 610 in which one or more sets of instructions 612, e.g. software, can be embedded. Further, the instructions 612 may embody one or more of the methods or logic as described herein. In a particular embodiment, the instructions 612 may reside completely, or at least partially, within the memory 604 and/or within the processor 602 during execution by the computer system 600. The memory 604 and the processor 602 also may include computer-readable media as discussed above.

The present disclosure contemplates a computer-readable medium that includes instructions 612 or receives and executes instructions 612 responsive to a propagated signal, so that a device connected to a network 620 can communicate voice, video, audio, images or any other data over the network 620. Further, the instructions 612 may be transmitted or received over the network 620 via a communication port 618. The communication port 618 may be a part of the processor 602 or may be a separate component. The communication port 618 may be created in software or may be a physical connection in hardware. The communication port 618 is configured to connect with a network 620, external media, the display 614, or any other components in system 600, or combinations thereof. The connection with the network 620 may be a physical connection, such as a wired Ethernet connection or may be established wirelessly as discussed below. Likewise, the additional connections with other components of the system 600 may be physical connections or may be established wirelessly.

The network 620 may include wired networks, wireless networks, or combinations thereof. The wireless network may be a cellular telephone network, an 802.11, 802.16, 802.20, or WiMax network. Further, the network 620 may be a public network, such as the Internet, a private network, such as an intranet, or combinations thereof, and may utilize a variety of networking protocols now available or later developed including, but not limited to TCP/IP based networking protocols.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

We claim:

1. A method for utilizing an anomalous query in bidding comprising:
   identifying a query from a plurality of search queries in a search log database;
   monitoring the search log database to determine a first frequency at which the identified query has been searched for during a first time interval;
   monitoring a second frequency at which the identified query is searched for during a second time interval;
   comparing the first frequency with a second frequency, wherein the comparison comprises determining whether the second frequency increased over the first frequency above a certain amount that comprises a spike recall constant multiplied by a standard deviation, wherein the standard deviation is based on at least one earlier time interval and the spike recall constant represents a relative amount of frequency change; and
   performing at least one of selling the identified query at an adjusted rate, purchasing the identified query for an advertisement, or recommending the identified query for an advertisement purchase when either the first frequency or the second frequency is above a threshold frequency and when the comparison indicates an increase above the certain amount.

2. The method according to claim 1 wherein the plurality of search queries are entered into a search engine and recorded to the search log database.

3. The method according to claim 1 wherein the at least one previous frequency comprises the first frequency and the first frequency comprises an average of a plurality of frequencies.

4. The method according to claim 1 wherein the certain amount is a percentage increase from the first frequency to the second frequency.

5. The method according to claim 1 wherein the monitoring of the search log database is in real-time.

6. The method according to claim 1 wherein the first frequency is a mean value of frequencies over the first time interval.

7. The method according to claim 1 wherein the comparison indicates an increase above the certain amount when the following equation is satisfied: $f/V-\mu > k*G$, wherein f is the frequency of the identified keyword, V is the total number of keywords over a time period, $\mu$ is mean of the normalized keyword frequency over the time period, k is the spike recall constant, and $\sigma$ is the standard deviation of the frequency normalized over the time period.

8. The method according to claim 1 wherein the second frequency is divided by a volume of queries when comparing with the first frequency.

9. The method according to claim 1 wherein the adjusted rate is an increased price based on the potential increase in frequency of the identified query.

10. In a computer readable storage medium having stored therein data representing instructions executable by a programmed processor for keyword identification, the storage medium comprising instructions for:
  monitoring a keyword database that includes keyword usage data; and
  identifying a keyword that has an unusually high frequency;
  wherein the step of identifying comprises:
    measuring a frequency of the identified keyword;
    observing a frequency change with the keyword;
    determining a threshold frequency; and
    recognizing the keyword as having an unusually high frequency when the frequency exceeds the threshold frequency and when the frequency change exceeds a predetermined frequency change that is based on a spike recall constant multiplied by a standard deviation of at least one previous frequency, wherein the spike recall constant represents a relative amount of frequency change.

11. The storage medium according to claim 10 wherein the keyword usage data includes a record of search requests made for the keywords in the keyword database.

12. The storage medium according to claim 10 wherein the predetermined frequency change is a percentage increase in frequency over a predetermined time.

13. The storage medium according to claim 10 further comprising:
  performing at least one of selling the identified keyword at an adjusted rate, purchasing the identified keyword for an advertisement, or recommending the identified keyword for an advertisement purchase.

14. The storage medium according to claim 13 wherein the performing step is only performed if the identified keyword is determined to have an unusually high frequency.

15. The storage medium according to claim 10 wherein the frequency change exceeds a predetermined frequency change if the following equation is satisfied: $f/V-\mu>k*\sigma$, wherein f is the frequency of the identified keyword, V is the total number of keywords over a time period, $\mu$ is mean of the normalized keyword frequency over the time period, k is the spike recall constant, and $\sigma$ is the standard deviation of the frequency normalized over the time period.

16. The storage medium according to claim 15 wherein the spike recall constant represents a required increase in frequency for recognizing the keyword as having an unusually high frequency.

17. A system identifying an anomalous query comprising:
  a search engine with a processor configured to receive queries and provide search results based on the queries;
  a search log database coupled with the search engine and configured to record the queries received by the search engine; and
  an event detector coupled with the search log database and configured to monitor the frequency of the queries that are input into the search engine, wherein the event detector is configured to recognize an anomalous query based on an increase in frequency of the anomalous query when the frequency exceeds a frequency threshold, and when a subsequent frequency divided by a volume of queries minus a prior frequency value is greater than a spike recall constant multiplied by a standard deviation.

18. The system according to claim 17 further comprising an ad server coupled with the search engine and the event detector.

19. The system according to claim 18 wherein the ad server provides at least one advertisement that is displayed by the search engine in response to receiving a query and providing the search result for that query.

20. The system according to claim 17 wherein if an anomalous query is recognized, the event detector is further configured to at least one of sell the anomalous query at an adjusted rate, purchase the anomalous query for an advertisement, or recommend the anomalous query for an advertisement purchase.

* * * * *